(12) United States Patent
Chen et al.

(10) Patent No.: US 8,905,615 B2
(45) Date of Patent: Dec. 9, 2014

(54) LIGHT SOURCE MODULE AND DISPLAY DEVICE HAVING THE SAME

(75) Inventors: Shih-Chieh Chen, New Taipei (TW); Yao-Chi Liu, Miaoli County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/313,019

(22) Filed: Dec. 7, 2011

(65) Prior Publication Data
US 2012/0327686 A1 Dec. 27, 2012

(30) Foreign Application Priority Data
Jun. 27, 2011 (TW) .............................. 100122453 A

(51) Int. Cl.
F21V 7/04 (2006.01)
F21S 8/00 (2006.01)
F21V 17/10 (2006.01)
F21V 17/12 (2006.01)

(52) U.S. Cl.
CPC . F21S 8/00 (2013.01); F21V 17/10 (2013.01); F21V 17/12 (2013.01)
USPC ............ 362/633; 362/600; 362/610; 362/632

(58) Field of Classification Search
USPC .................................. 362/633, 600, 610, 632
See application file for complete search history.

(56) References Cited

U.S. PATENT DOCUMENTS

| | | | |
|---|---|---|---|
| 6,580,476 B2 | 6/2003 | Hasegawa | |
| 7,258,478 B2 * | 8/2007 | Chiang | 362/633 |
| 7,527,419 B2 * | 5/2009 | Choi et al. | 362/634 |
| 7,695,182 B2 * | 4/2010 | Iwasaki | 362/633 |
| 7,889,286 B2 * | 2/2011 | Yoo | 349/58 |
| 8,113,706 B2 * | 2/2012 | Lin | 362/633 |
| 2002/0021382 A1 | 2/2002 | Hasegawa | |
| 2004/0189889 A1 | 9/2004 | Nitto et al. | |

FOREIGN PATENT DOCUMENTS

| | | |
|---|---|---|
| CN | 102042533 | 5/2011 |
| TW | I231877 | 5/2005 |
| TW | 200839365 | 10/2008 |
| TW | 200848855 | 12/2008 |

OTHER PUBLICATIONS

"First Office Action of China Counterpart Application", issued on Oct. 30, 2012, p. 1-p. 4, in which the listed references were cited.
"Office Action of Taiwan Counterpart Application", issued on Dec. 16, 2013, pp. 1-6, in which the listed references (TWI231877 and TW200848855) were cited.

* cited by examiner

Primary Examiner — Jong-Suk (James) Lee
Assistant Examiner — Mark Tsidulko
(74) Attorney, Agent, or Firm — Jianq Chyun IP Office

(57) ABSTRACT

A light source module includes a first frame, a second frame, a light guide plate, a light source, at least one positioning element and at least one buffer element. The second frame is disposed corresponding to the first frame and has at least one through hole. The light guide plate is disposed between the first frame and the second frame and has a light incident surface and a side surface, and the side surface faces to the through hole of the second frame. The light source is disposed on the light incident surface of the light guide plate. The positioning element is disposed in the through hole of the second frame. The buffer element is located between the positioning element and the side surface of the light guide plate.

14 Claims, 7 Drawing Sheets

LIGHT SOURCE MODULE AND DISPLAY DEVICE HAVING THE SAME

CROSS-REFERENCE TO RELATED APPLICATION

This application claims the priority benefit of Taiwan application serial no. 100122453, filed on Jun. 27, 2011. The entirety of the above-mentioned patent application is hereby incorporated by reference herein and made a part of this specification.

BACKGROUND OF THE INVENTION

1. Field of the Invention

The present invention relates to a light source module and a display device having the same.

2. Description of Related Art

Among various flat panel displays (FPD), Liquid Crystal Display (LCD) has become a mainstream in the market due to its advantages such as high space utilization, low power consumption, absence of radiation, and low electromagnetic interference. Generally, a conventional LCD device includes a LCD panel and a backlight module. Since the LCD panel does not have a self-illuminating property, the backlight module should be disposed under the LCD panel so as to provide a backlight source to the LCD panel.

Conventional backlight modules are divided into side type backlight modules and direct type backlight modules. The side type backlight module includes a light source and a light guide plate, and the light source is disposed on a light incident surface of the light guide plate. The light from the light source emits into the light guide plate through the light incident surface and then exits the light guide plate from the light emitting surface.

Usually, the light guide plate of the backlight module is positioned through a frame, and a space is remained between the frame and the light guide plate so as to tolerate variations of manufacturing processes, assembly process and volume expansion owing to environmental changes. However, if the space remained between the frame and the light guide plate is too large, excessive shift between the frame and the light guide plate may deteriorate display quality of the display device. If the space remained between the frame and the light guide plate is too small, the volume expansion of the light guide plate owing to temperature or/and humidity changing may cause the light guide plate warping so as to result in mura which means the image displayed on the display panel is not uniform.

SUMMARY OF THE INVENTION

Accordingly, the present invention is directed to a light source module and a display device having the same capable of avoiding excessively shifting between the frame and the light guide plate and preventing the light guide plate from warping or deforming.

The present invention provides a light source module includes a first frame, a second frame, a light guide plate, a light source, at least one positioning element and at least one buffer element. The second frame is disposed corresponding to the first frame and has at least one through hole. The light guide plate is disposed between the first frame and the second frame and has a light incident surface and a side surface, and the side surface faces to the through hole of the second frame. The light source is disposed on the light incident surface of the light guide plate. The positioning element is disposed in the through hole of the second frame. The buffer element is located between the positioning element and the side surface of the light guide plate.

The present invention also provides a display device including a display panel and a light source module disposed under the display panel. The light source module includes a first frame, a second frame, a light guide plate, a light source, at least one positioning element and at least one buffer element. The second frame is disposed corresponding to the first frame and has at least one through hole. The light guide plate is disposed between the first frame and the second frame and has a light incident surface and a side surface, and the side surface faces to the through hole of the second frame. The light source is disposed on the light incident surface of the light guide plate. The positioning element is disposed in the through hole of the second frame. The buffer element is located between the positioning element and the side surface of the light guide plate.

In light of the foregoing, the positioning element and the buffer element are utilized to position the light guide plate in the light source module, and thus the light guide plate can be disposed near the buffer element so as to avoid the light guide plate excessively shifting. In addition, when the volume expansion of the light guide plate owing to temperature or/and humidity changing occurs, the buffer element may tolerate said volume expansion of the light guide plate so as to prevent the light guide plate from warping or deforming.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
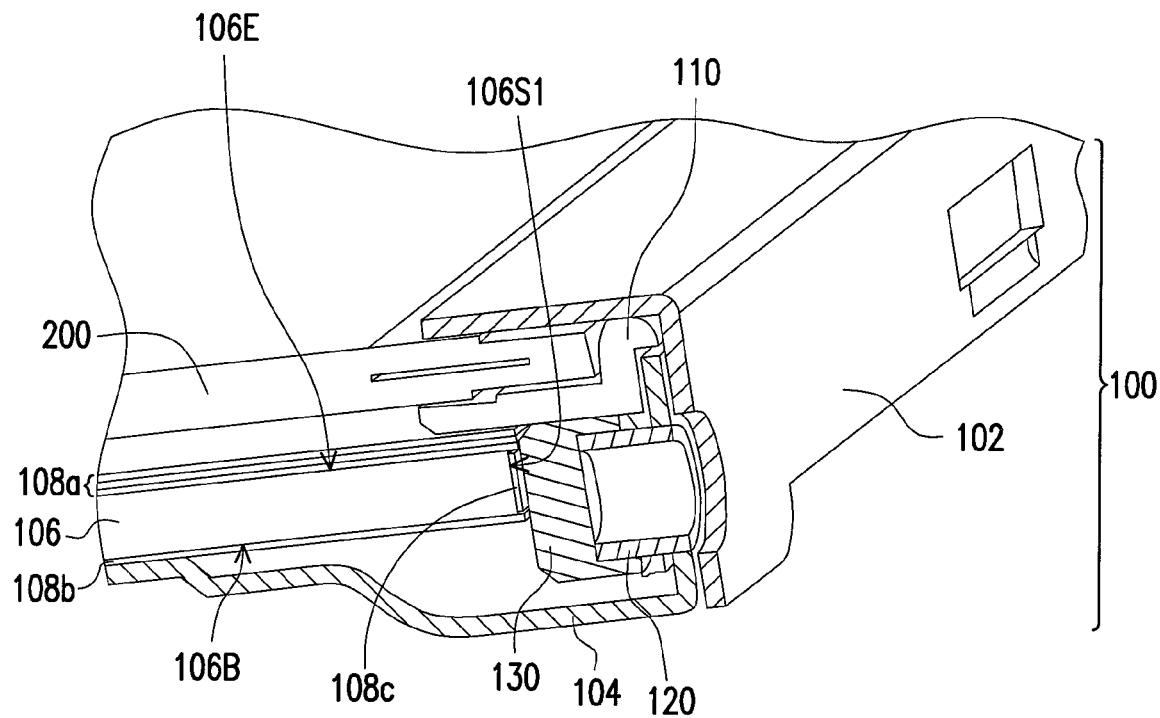
FIG. 1 is a schematic diagram showing a portion of a display device according to an embodiment of the invention.

FIG. 1 is a schematic diagram showing a portion of a display device according to an embodiment of the invention.

Figure 2:
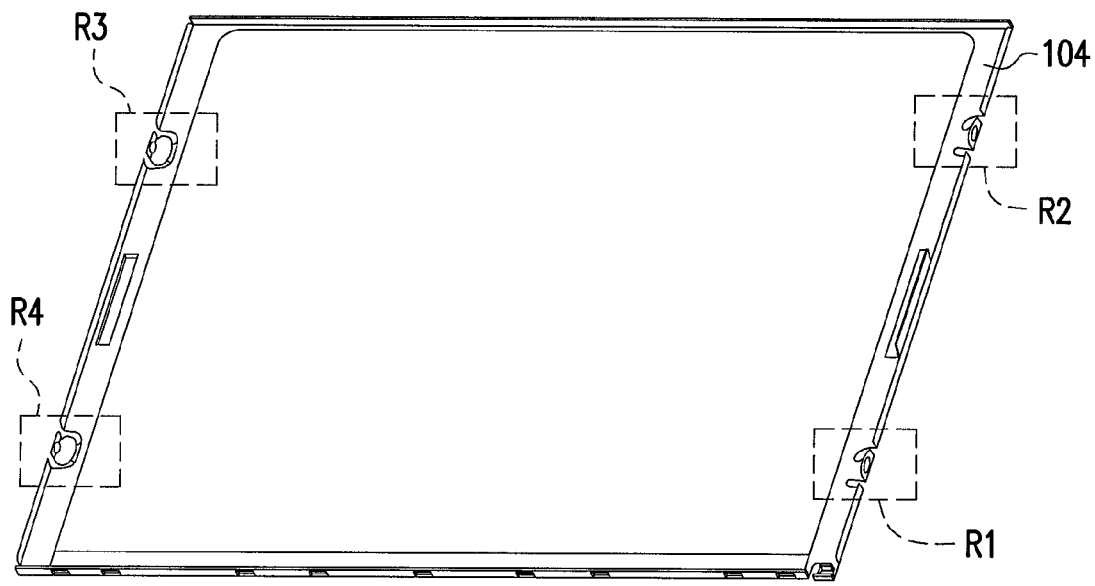
FIG. 2 is a schematic diagram showing the second frame of the display device in FIG. 1.
Figure 3:
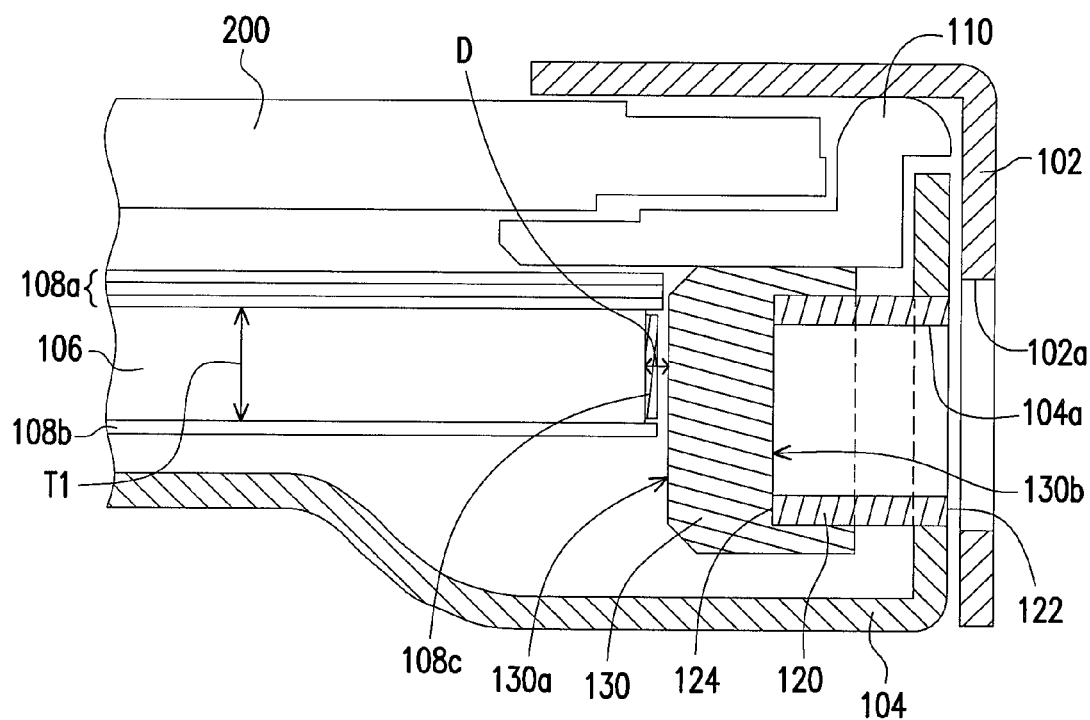
FIG. 3 is a schematic cross-sectional diagram showing the display device of FIG. 1.
Figure 4:
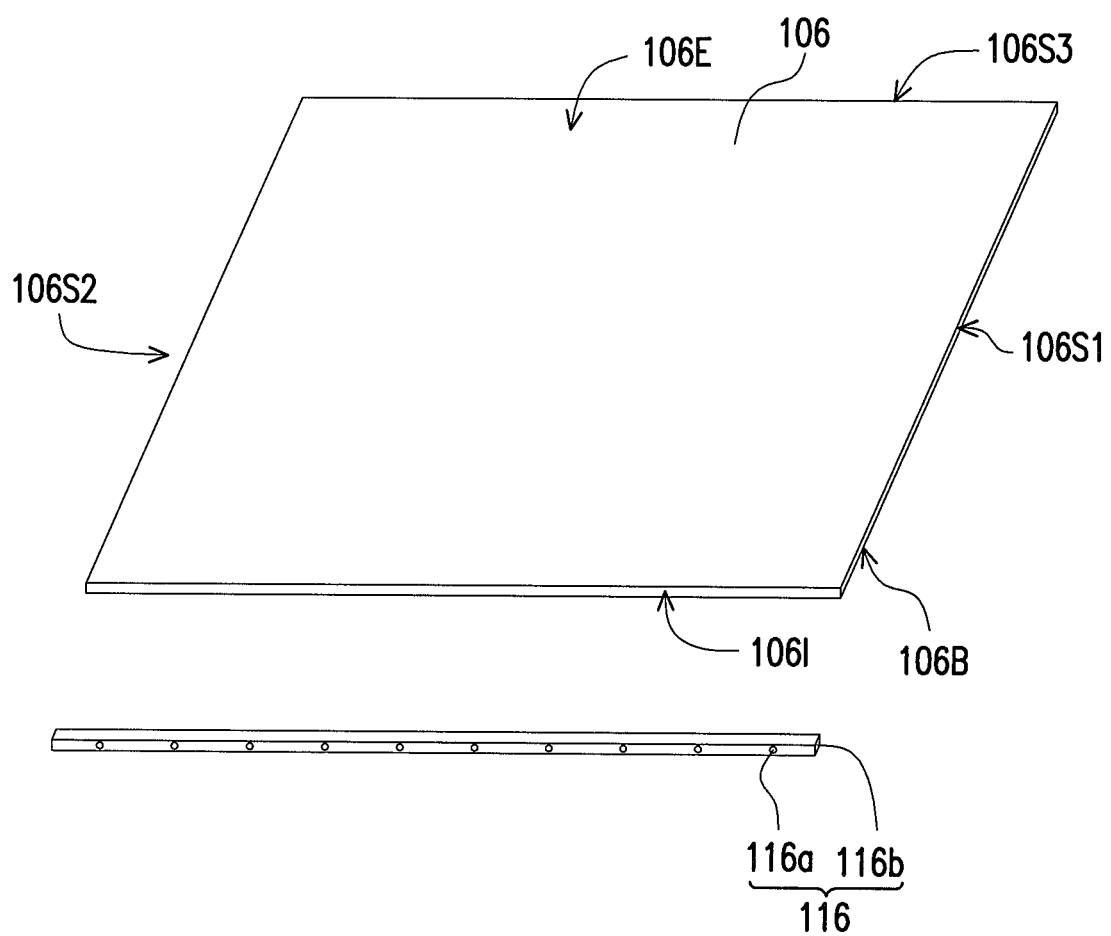
FIG. 4 is a schematic diagram showing the light guide plate and the light source of the light source module in FIG. 1.

FIG. 2 is a schematic diagram showing the second frame of the display device in FIG. 1. FIG. 3 is a schematic cross-sectional diagram showing the display device of FIG. 1. FIG. 4 is a schematic diagram showing the light guide plate and the light source of the light source module in FIG. 1. Referring to FIG. 1, FIG. 2, FIG. 3 and FIG. 4, the display device of the embodiment comprises a display panel 200 and a light source module 100.

The display panel 200 is, for example, a liquid crystal display panel without a self-illuminating property or an organic electroluminescence display panel with a self-illuminating property. In the embodiment, the liquid crystal display panel is taken as an example for descriptions. Generally, the liquid crystal display panel comprises a pixel array substrate, a counter substrate and a liquid crystal layer between the two substrates. The pixel array substrate includes scan lines, data lines and pixel structures thereon. The counter substrate may be a blank substrate, a substrate having an electrode film thereon, or a substrate having an electrode film and a color filter array thereon. Since the liquid crystal layer does not emit light, a light source module 100 is usually disposed under the display panel 200 to provide a backlight source to the display panel 200.

The light source module 100 includes a first frame 102, a second frame 104, a light guide plate 106, a light source 116, at least one positioning element 120 and at least one buffer element 130.

The first frame 102 may be referred to a front frame, which is mainly used to fasten the light source module 100 and the display panel 200. The first frame 102 is a hollow frame structure such that a display region of the display panel 200 can be exposed. In consideration of mechanical strength, the first frame 102 is often made of a metal material, but it is not limited in the invention. In addition, the first frame 102 has at least one first through hole 102a.

The second frame 104 is disposed corresponding to the first frame 102. The second frame 104 may be referred to a back plate, which is mainly used to carry elements of the light source module 100. In consideration of mechanical strength, the second frame 104 is often made of a metal material, but it is not limited in the invention. In addition, the second frame 104 has at least one second through hole 104a, and the at least second through hole 104a is corresponding to the at least first through hole 102a.

In the embodiment, as shown in FIG. 2, the second through holes 104a of the second frame 104 are disposed at opposite sides of the second frame 104 (such as in the regions R1~R4), which are not limited in the invention. According to another embodiment, the second through holes 104a may also be disposed at one side, three sides or four sides of the second frame 104. According to the embodiment, the at least second through hole 104a is corresponding to the at least first through hole 102a, and thus the first through holes 102a of the first frame 104 are disposed at opposite sides of the first frame 102, which are not limited in the invention. According to another embodiment, the first through holes 102a may also disposed at one side, three sides or four sides of the first frame 102.

In the embodiment, a supporting frame 110 is further disposed between the first frame 102 and the second frame 104, as shown in FIG. 1, which is mainly used to support the display panel 200. Since the supporting frame 110 is mainly used to support the display panel 200, the supporting frame 110 can be made of a plastic material, so as to reduce the total weight of the light source module and prevent the supporting frame 110 from damaging the display panel 200. However, the present invention does not limit the material of the supporting frame 110.

The light guide plate 106 is disposed between the first frame 102 and the second frame 104. That is, the light guide plate 106 is disposed in a holding space between the first frame 102 and the second frame 104. In the embodiment, the light guide plate 106 has a light incident surface 106I, a light emitting surface 106E and side surfaces 106S1~106S3. The light emitting surface 106E is disposed opposite to a bottom surface 106B of the light guide plate 106, and the light incident surface 106I and the side surfaces 106S1~106S3 are connected to the light emitting surface 106E and the bottom surface 106B, so as to from a hexahedron structure. Micro-optical structures (not shown) may also be formed inside the light guide plate 106 or on the light guide plate 106 to increase light guiding effect. Moreover, in consideration of thinning the display device, a thickness of the light guide plate 106 T1 is smaller than 4 mm, preferably the thickness of the light guide plate 106 T1 is smaller than 2 mm, which is not limited in the invention.

According to the embodiment, the first through hole 102a of the first frame 102 and the second through hole 104a of the second frame 104 expose the side surface of the light guide plate 106. For example, the first through hole 102a and the second through hole 104a in the region R1 and the region R2 expose the side surface 106S1 of the light guide plate 106, and the first through hole 102a and the second through hole 104a in the region R3 and the region R4 expose the side surface 106S2 of the light guide plate 106.

The light source 116 is disposed corresponding to the light incident surface 106I of the light guide plate 106, herein the light source 116 is disposed on the light incident surface 106I of the light guide plate 106. The light source 116 can be attached on the light incident surface 106I of the light guide plate 106 or disposed apart from the light incident surface 106I of the light guide plate 106. In the embodiment, the light source 116 comprises a plurality of point light sources 116a (such as light emitting diode light sources) and a circuit board 116b, which is not limited in the invention. According to another embodiment, the light source 116 may also be cold cathode fluorescent lamps (CCFL) or other light sources. In addition, the light source 116 is disposed at one side of the light guide plate 106, which is not limited in the invention. According to another embodiment, the light guide plate 106 has two or more light incident surfaces 106I, and the light source 116 is disposed at the two or more light incident surfaces 106I.

In the embodiment, the light source module 100 may further comprise optical films 108a~108c. The optical film 108a is disposed on the light guide plate 106 (above the light emitting surface 106E) and comprises a diffusion film, a prism film or other optical films. The optical film 108b is disposed under the light guide plate 106 (under the bottom surface 106V), and the optical film 108b is a reflective film, for example. The optical film 108c is disposed on the side surfaces of the light guide plate 106 (side surfaces 106S1~106S3), and the optical film 108c is a reflective film, for example.

The positioning element 120 is disposed in the second through hole 104a of the second frame 104. The positioning element 120 not only provides a screw or other fastening element to fix external elements (such as a plastic outer frame) on the light source module 100, the positioning element 120 also positions the light guide plate 106 to fix the light guide plate 106 between the first frame 102 and the second frame 104 and prevent the light guide plate 106 from shifting. For detail, the positioning element 120 is fastened in the second through hole 104a of the second frame 104 for the screw or other fastening element, and therefore the positioning element 120 is a hallow pillar or a hallow structure. In addition, the positioning element 120 includes a top portion 124 and a bottom portion 122. When the positioning element 120 is fastened in the second through hole 104a of the second frame 104, the bottom portion 122 is wedged in the second through hole 104a of the second frame 104 and the top portion 124 faces to the side surface of the light guide plate 106. For example, the top portions 124 of the positioning elements 120 in the regions R1, R2 face to the side surface 106S1 of the light guide plate 106, and the top portions 124 of the positioning elements 120 in the regions R3, R4 face to the side surface 106S2 of the light guide plate 106. The positioning element 120 comprises a screw pillar, a pin structure or other positioning elements.

The buffer element 130 is located between the positioning element 120 and the light guide plate 106. One side 130b of the buffer element 130 is disposed adjacent to the positioning element 120 and another side 130a of the buffer element 130 is disposed adjacent to the light guide plate 106. For example, the buffer elements 130 in the regions R1, R2 are disposed between the positioning element 120 and the side surface 106S1 of the light guide plate 106, wherein one side 130b of the buffer elements 130 is disposed adjacent to the positioning element 120 and another side 130a of the buffer elements 130 is disposed adjacent to the side surface 106S1 of the light guide plate 106. The buffer elements 130 in the regions R3, R4 are disposed between the positioning element 120 and the side surface 106S2 of the light guide plate 106, wherein one side 130b of the buffer elements 130 is disposed adjacent to the positioning element 120 and another side 130a of the buffer elements 130 is disposed adjacent to the side surface 106S2 of the light guide plate 106.

Usually, when assembling the light source module 100, a space is remained between the light guide plate 106 and the second frame 104 (the positioning element 120) to provide an assembly tolerance. The space (assembly tolerance) is related to the size, the material, the thickness and the expansion coefficient of the light guide plate 106. For instance, if the light guide plate 106 has a thickness of 2 mm and has a size of 15 inch, the space (assembly tolerance) is 1 mm. If the light guide plate 106 has a thickness of 2 mm and has a size of 21.5 inch, the space (assembly tolerance) is 1.4 mm. If the light guide plate 106 has a thickness of 2 mm and has a size of 27 inch, the space (assembly tolerance) is 1.7 mm. In the embodiment, because the buffer element 130 is disposed between the light guide plate 106 and the positioning element 120, the space (assembly tolerance) can be reduced. For detail, the buffer element 130 may buffer the stress from the light guide plate 106, and therefore if the buffer element 130 has an enough compression ratio to prevent the light guide plate 106 from warping or deforming, the space (assembly tolerance) can be reduced. In particular, the smaller the distance between the buffer element 130 and the light guide plate 106 is, the less the shifting of the light guide plate 106 is.

Since the buffer element 130 is mainly used to buffer the stress between the positioning element 120 and the light guide plate 106, any material capable of tolerating the stress between the positioning element 120 and the light guide plate 106 can be used as the material of the buffer element 130. For instance, the buffer element 130 comprises a foam material (such as a polyurethane foam material), a rubber material, a silicon material, a silica gel, a micro-cell polymer material, a micro-porous polymer material or a combination thereof.

In addition, the buffer element 130 is disposed between the positioning element 120 and the light guide plate 106, the positioning element 120 is disposed in the second hole 104a of the second frame 104, and the second hole 104a corresponds to the first hole 102a of the first frame 102. Therefore, the buffer element 130 may shield the second through hole 104a and the first through hole 102a. Because the buffer element 130 may shield the second through hole 104a and the first through hole 102a, the buffer element 130 may block external substances from entering the light source module 100 through the second through hole 104a and the first through hole 102a. In addition, the buffer element 130 may also shield the light emitted from the light source 116 and the light guide plate 106 so as to prevent the light from leaking to the outside of the light source module 100.

In the embodiment, the buffer element 130 is attached on the positioning element 120. The buffer element 130 can be attached on the positioning element 120 through an adhesive material, for example.

Figure 5A:
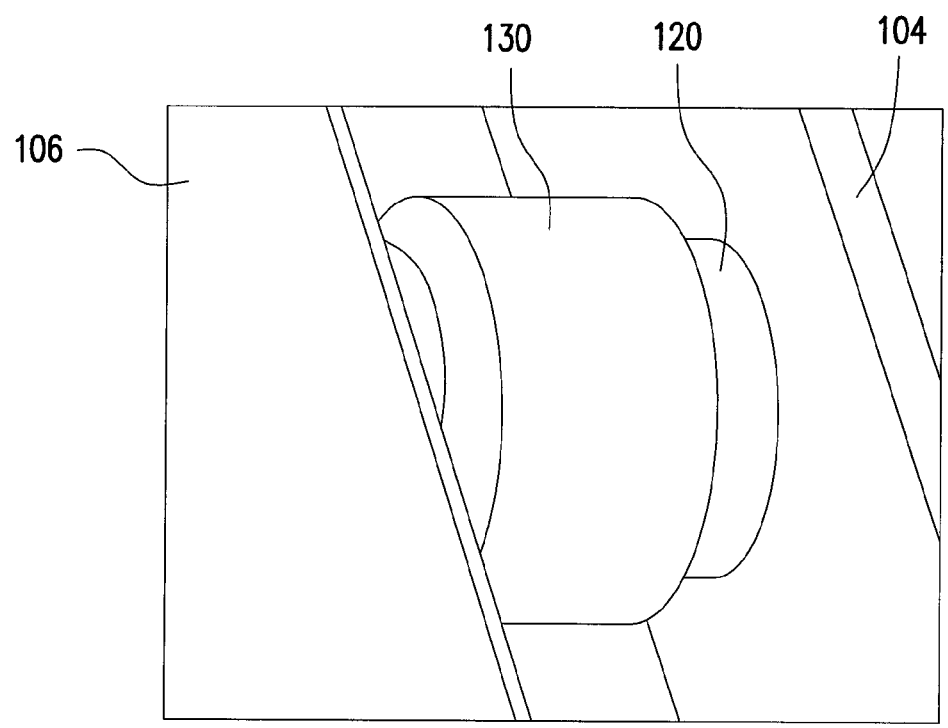
FIG. 5A and FIG. 5B are schematic diagrams showing a portion of a display device according to an embodiment of the invention.
Figure 5B:
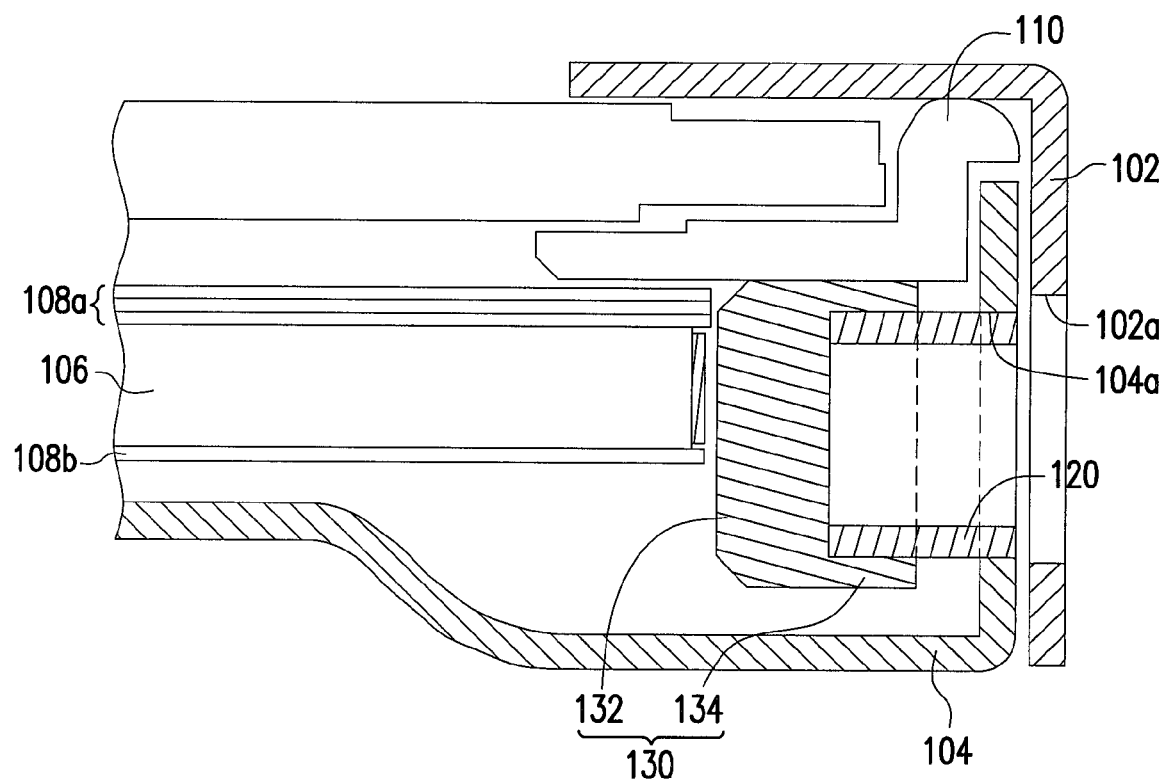

According to another embodiment, the buffer element 130 is capped on the positioning element 120. As shown in FIG. 5A and FIG. 5B, the buffer element 130 comprises a buffer portion 132 and a capping portion 134, the capping portion 134 covers the positioning element 120, and the buffer potion 132 is disposed between the positioning element 120 and the light guide plate 106. Namely, the buffer potion 132 of the buffer element 130 is mainly used to buffer the stress between the positioning element 120 and the light guide plate 106, and the capping portion 134 covering the positioning element 120 is mainly used to fix the buffer element 130 on the positioning element 120. In the embodiment shown in FIG. 5A and FIG. 5B, the capping portion 134 of the buffer element 130 partially covers the positioning element 120.

Figure 6A:
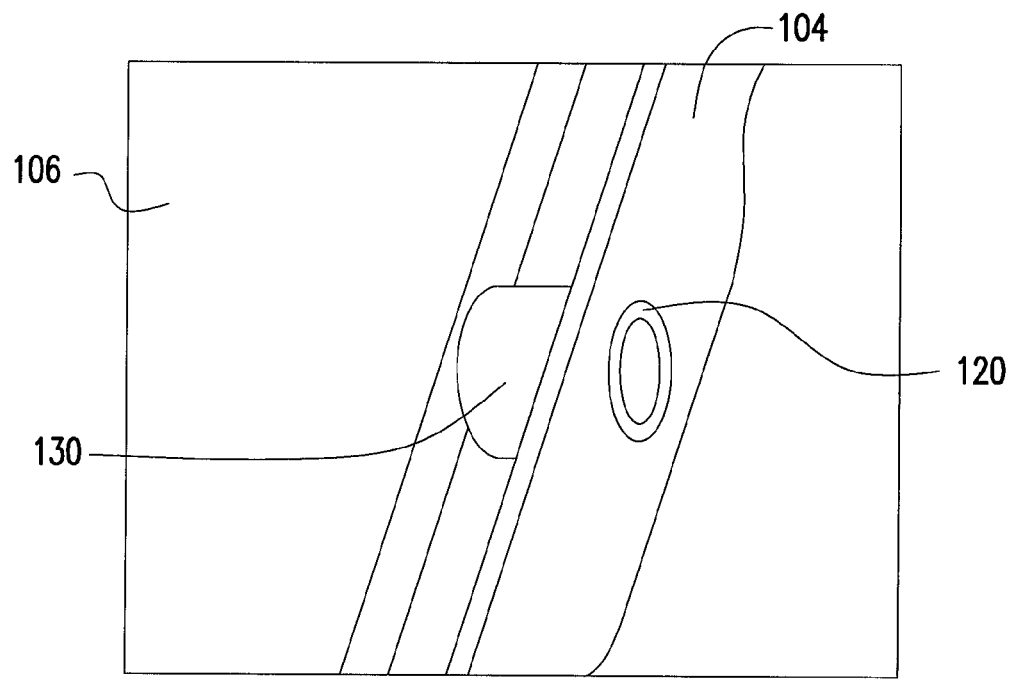
FIG. 6A and FIG. 6B are schematic diagrams showing a portion of a display device according to an embodiment of the invention.
Figure 6B:
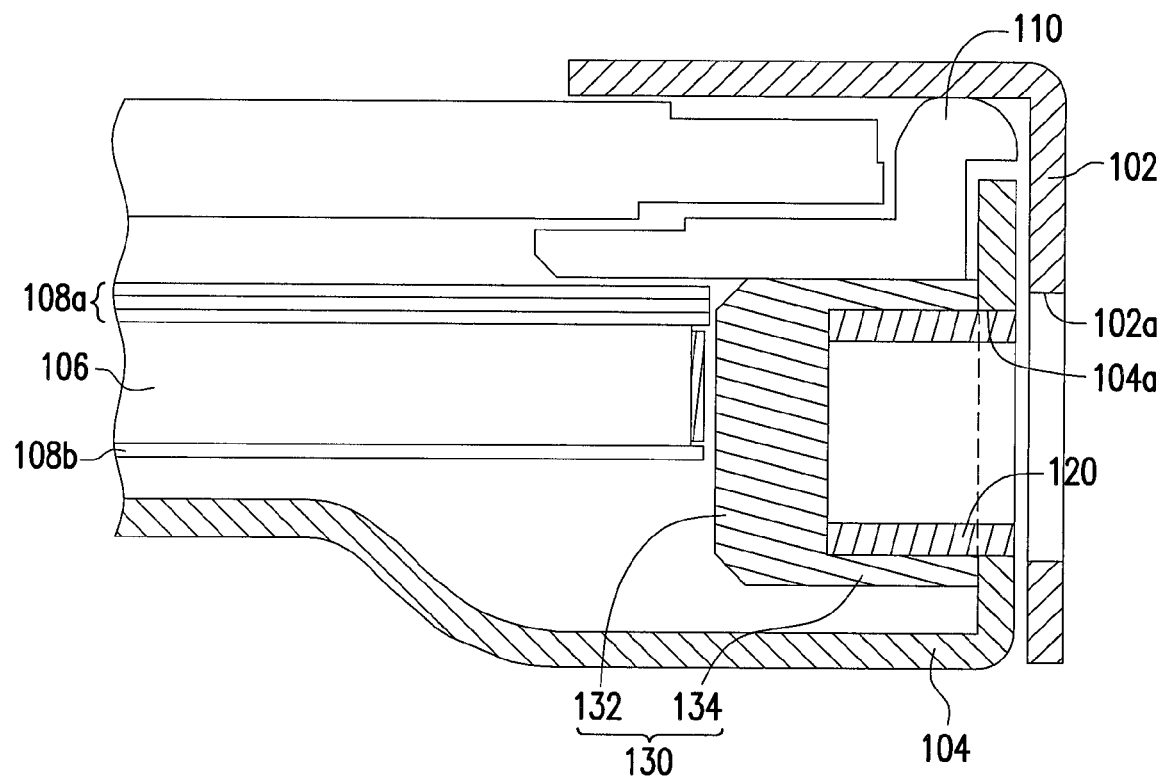

In another embodiment, the capping portion 134 of the buffer element 130 completely covers the positioning element 120, as shown in FIG. 6A and FIG. 6B.

Figure 7A:
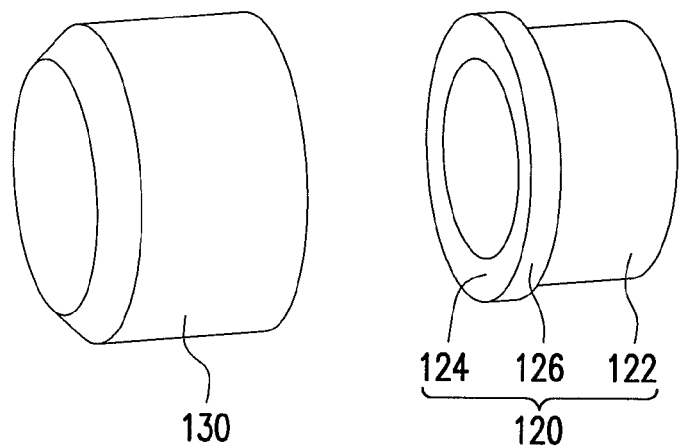
FIG. 7A is schematic diagram showing a buffer element and a positioning element according to an embodiment of the invention.
Figure 7B:
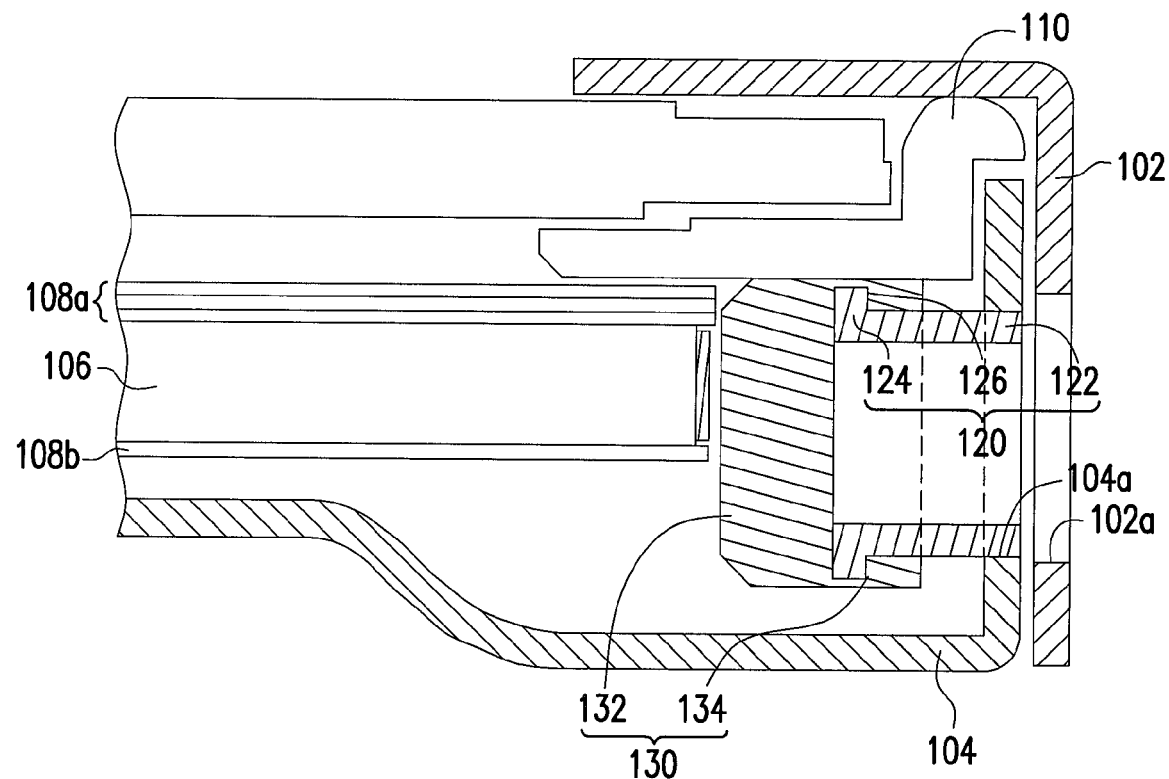
FIG. 7B is schematic diagram showing a display device having the buffer element and the positioning element of FIG. 7A.

According to another embodiment, the buffer element 130 and the positioning element 120 may also be disposed as shown FIG. 7A and FIG. 7B. That is, the top portion 124 of the positioning element 120 comprises a fastening structure 126 which is fastened with the buffer element 130 so as to fix the buffer element 130 on the surface of the positioning element 120.

Figure 8A:
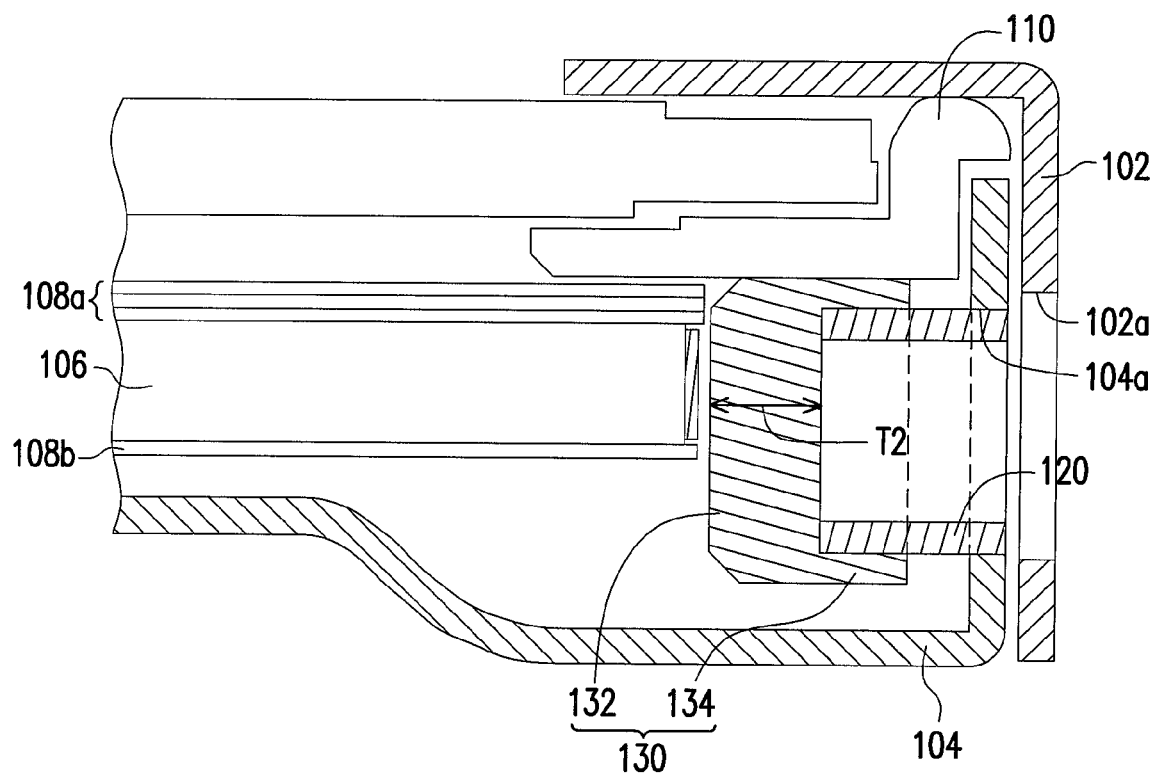
FIG. 8A and FIG. 8B are schematic diagrams showing a portion of a display device according to an embodiment of the invention
Figure 8B:
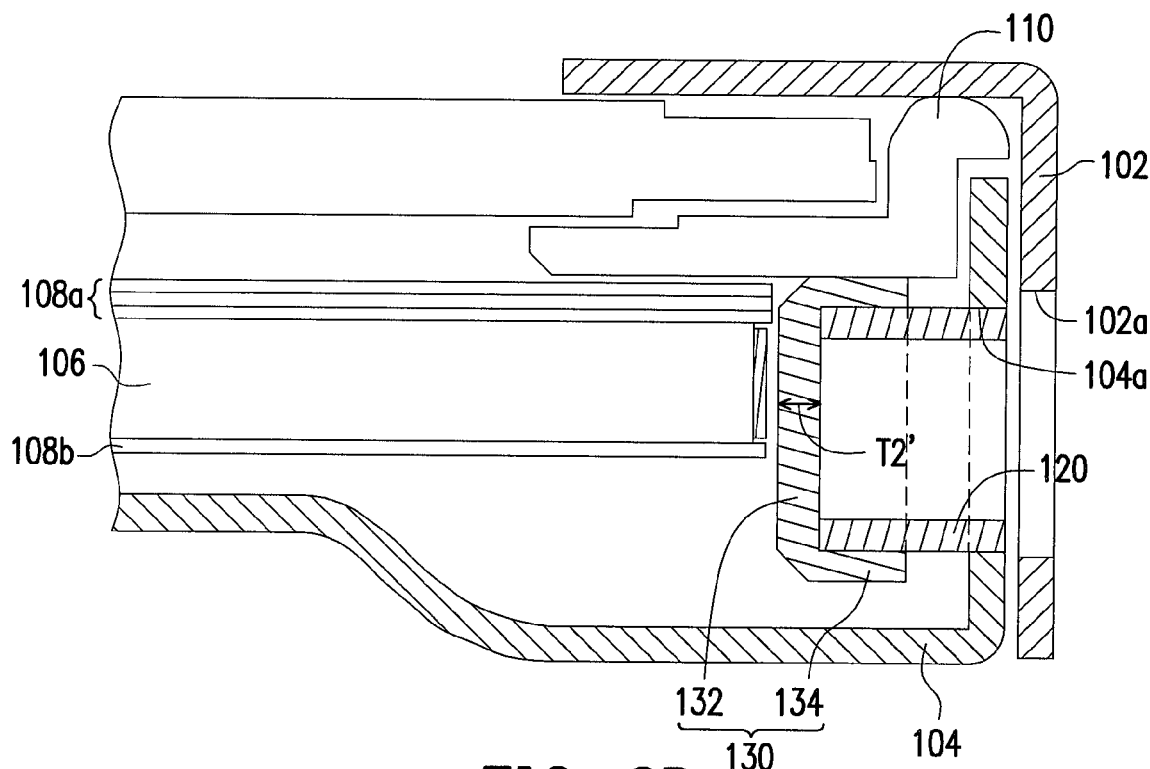

Moreover, the thickness of the buffer portion 130b of the buffer element 130 may be adjusted. As shown in FIG. 8A and FIG. 8B, the thickness of the buffer portion 130b of the buffer element 130 may be adjusted according to the size and the thickness of the light guide plate 106 and the material of the buffer element 130. For example, if the size of the light guide plate 106 is larger, the buffer portion 130b of the buffer element 130 needs to have a larger stress tolerance, and a material having larger buffer capability is used for the buffer element 130. Alternatively, if a material having a normal stress tolerance is used, the thickness T2 of the buffer portion 130b of the buffer element 130 is increased so as to provide an enough buffer capability, as shown in FIG. 8A. On the contrary, if the size of the light guide plate 106 is smaller, the buffer portion 130b of the buffer element 130 merely needs to have a smaller stress tolerance, and a material having smaller buffer capability is used for the buffer element 130. Alternatively, if a material having a larger stress tolerance is used, the thickness T2' of the buffer portion 130b of the buffer element 130 can be reduced, as shown in FIG. 8B.

It is noted that if the thickness T2' of the buffer portion 130b of the buffer element 130 is reduced, as shown in FIG. 8B, the size of the light guide plate 106 can be increased, such that the edges of the light guide plate 106 can extend toward the first and second frames 102, 104, and thereby the edge leakage in the display region of the display panel 200 is reduced.

In light of the foregoing, the positioning element and the buffer element are used to position the light guide plate in the light source module, and therefore the light guide plate can be disposed near the buffer element so as to avoid the light guide plate excessively shifting In addition, when volume expansion of the light guide plate owing to temperature or/and humidity changing occurs, the buffer element may tolerate said volume expansion of the light guide plate so as to prevent the light guide plate from warping or deforming. Because the buffer element may prevent the light guide plate from warping or deforming, the display device using the light source module may have better display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source module, comprising:
    a first frame;
    a second frame disposed corresponding to the first frame and having at least one through hole;
    a light guide plate disposed between the first frame and the second frame and having a light incident surface and a side surface, and the side surface faces to the through hole of the second frame;
    a light source disposed corresponding to the light incident surface of the light guide plate;
    at least one positioning element disposed in the through hole of the second frame; and
    at least one buffer element located between the positioning element and the side surface of the light guide plate, wherein the buffer element and the light guide plate are not overlapping each other.

2. The light source module as claimed in claim 1, wherein the first frame further comprises at least one through hole, the through hole of the second frame is disposed corresponding to the through hole of the first frame, and the through hole of the second frame and the through hole of the first frame expose the side surface.

3. The light source module as claimed in claim 1, wherein a side of the buffer element is disposed adjacent to the positioning element and another side of the buffer element is disposed adjacent to the light guide plate.

4. The light source module as claimed in claim 1, wherein the buffer element is attached on the positioning element.

5. The light source module as claimed in claim 1, wherein the buffer element is capped on the positioning element.

6. The light source module as claimed in claim 1, wherein the buffer element comprises a buffer portion and a capping portion, the capping portion covers the positioning element, and the buffer potion is disposed between the positioning element and the light guide plate.

7. The light source module as claimed in claim 6, wherein the capping portion completely covers the positioning element or partially covers the positioning element.

8. The light source module as claimed in claim 1, wherein the positioning element comprises a top portion and a bottom portion, the bottom portion is wedged in the through hole of the second frame, and the top portion faces to the side surface of the light guide plate.

9. The light source module as claimed in claim 8, wherein the top portion of the positioning element comprises a fastening structure which is fastened with the buffer element so as to fix the buffer element on a surface of the positioning element.

10. The light source module as claimed in claim 1, wherein the buffer element shields the through hole of the second frame and the through hole of the first frame.

11. The light source module as claimed in claim 1, wherein a thickness of the light guide plate is smaller than 4 mm.

12. The light source module as claimed in claim 1, wherein the buffer element comprises a foam material, a rubber material, a silicon material, a silica gel, a micro-cell polymer material, a micro-porous polymer material or a combination thereof.

13. The light source module as claimed in claim 1, wherein the positioning element comprises a screw pillar or a pin structure.

14. A display device, comprising:
    a display panel; and
    a light source module disposed under the display panel and comprising:
        a first frame;
        a second frame disposed corresponding to the first frame and having at least one through hole;
        a light guide plate disposed between the first frame and the second frame and having a light incident surface and a side surface, and the side surface faces to the through hole of the second frame;
        a light source disposed corresponding to the light incident surface of the light guide plate;
        at least one positioning element disposed in the through hole of the second frame; and
        at least one buffer element located between the positioning element and the side surface of the light guide plate, wherein the buffer element and the light guide plate are not overlapping each other.

* * * * *